United States Patent
Suzuki et al.

(10) Patent No.: US 11,596,977 B2
(45) Date of Patent: Mar. 7, 2023

(54) PLATE-LIKE MEMBER VIBRATION CONTROL DEVICE

(71) Applicant: HONDA MOTOR CO., LTD., Tokyo (JP)

(72) Inventors: Shunji Suzuki, Wako (JP); Toshizumi Yamaguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 577 days.

(21) Appl. No.: 16/724,878

(22) Filed: Dec. 23, 2019

(65) Prior Publication Data
US 2020/0206777 A1 Jul. 2, 2020

(30) Foreign Application Priority Data
Dec. 27, 2018 (JP) .............................. JP2018-244727

(51) Int. Cl.
B06B 1/02 (2006.01)
(52) U.S. Cl.
CPC ........ B06B 1/0253 (2013.01); *B06B 2201/30* (2013.01); *B06B 2201/55* (2013.01)
(58) Field of Classification Search
CPC .............. B06B 1/0253; B06B 2201/30; B06B 2201/55; F16F 15/002; F16F 2224/0283;
(Continued)

(56) References Cited

U.S. PATENT DOCUMENTS

| 2008/0264142 | A1* | 10/2008 | Hanselka ................. G01N 3/06 52/741.1 |
| 2015/0255704 | A1 | 9/2015 | Kim et al. |
| 2019/0255568 | A1* | 8/2019 | Kojima ............... H01L 41/0477 |

FOREIGN PATENT DOCUMENTS

| CN | 101175982 A | 5/2008 |
| CN | 101438078 A | 5/2009 |

(Continued)

OTHER PUBLICATIONS

Office Action dated Mar. 15, 2021, issued in counterpart CN Application No. 201910949199.5, with English Translation. (12 pages).

(Continued)

*Primary Examiner* — Rina I Duda
*Assistant Examiner* — Bradley R Brown
(74) *Attorney, Agent, or Firm* — WHDA, LLP (57) ABSTRACT

A vibration control device of a plate-like member 11 includes: a plurality of piezoelectric element actuators 14; at least one piezoelectric element sensor 15; and a control circuit 17 that performs feedback control of operation of the piezoelectric element actuators 14 based on an output voltage of the piezoelectric element sensor 15 so as to suppress vibration of the plate-like member 11. A layout of the piezoelectric element sensor 15 and the piezoelectric element actuators 14 is set such that anti-resonance occurs in an output voltage of the piezoelectric element sensor 15 in a range where the vibration frequency of the plate-like member 11 is equal to or less than a predetermined value. Therefore, generation of noise can be prevented at the frequency. As a result, a gain can be increased at a control target frequency. Therefore, vibration can be suppressed, and noise can be reduced.

5 Claims, 8 Drawing Sheets

(58) Field of Classification Search
CPC .. F16F 2230/08; F16F 15/005; F16F 2228/04; F16F 2230/18; G10K 11/17857; G10K 11/17875; G10K 2210/1291; H02N 2/005; H02N 2/008

See application file for complete search history.

(56) References Cited

FOREIGN PATENT DOCUMENTS

| | | | |
|---|---|---|---|
| CN | 201656808 U | * | 11/2010 |
| CN | 201656808 U | | 11/2010 |
| JP | H04-86898 A | | 3/1992 |
| JP | H06-149271 A | | 5/1994 |
| JP | 2000166260 A | | 6/2000 |
| JP | 2010-60985 A | | 3/2010 |
| JP | 2010-106537 A | | 5/2010 |
| JP | 2013-50534 A | | 3/2013 |
| JP | 2014-206257 A | | 10/2014 |

OTHER PUBLICATIONS

Office Action dated Sep. 15, 2021, issued in counterpart JP application No. 2018-244727, with English translation. (6 pages).

* cited by examiner

REVERSELY BENT PORTION

PLATE-LIKE MEMBER VIBRATION CONTROL DEVICE

CROSS-REFERENCE OF RELATED APPLICATION

This application claims priority of Japanese Patent Application No. 2018-244727 filed in Japan on Dec. 27, 2018, the entire contents of which are incorporated herein by reference.

TECHNICAL FIELD

The present invention relates to a plate-like member vibration control device including: a plurality of piezoelectric element actuators disposed on a surface of a plate-like member; at least one piezoelectric element sensor disposed on the surface of the plate-like member at a position sandwiched by the plurality of piezoelectric element actuators; and a control circuit that performs feedback control of operation of the plurality of piezoelectric element actuators based on an output voltage of the piezoelectric element sensor so as to suppress vibration of the plate-like member.

BACKGROUND OF THE INVENTION

An apparatus in which a piezoelectric element sensor (piezoelectric element for detection) and a piezoelectric element actuator (piezoelectric element for vibration control) are fixed to a peripheral wall surface of a damper of a suspension device of an automobile, the piezoelectric element sensor detects its own deformation caused by vibration of the damper as a voltage signal, the voltage signal is amplified with an amplification circuit, and the piezoelectric element actuator is driven to stretch and compress the damper to suppress the vibration is disclosed in Japanese Patent Application Publication No. 2014-206257.

By the way, if a piezoelectric element actuator and a piezoelectric element sensor are fixed to a surface of a plate-like member, and feedback control of an input to the piezoelectric element actuator is performed from a circuit based on a voltage signal output from the piezoelectric element sensor that detects strain generated on a surface of the plate according to film surface vibration of the plate-like member, the vibration of the plate-like member can be suppressed, and noise generated by the vibration can be reduced.

In order for the piezoelectric element actuator to exhibit a vibration control effect, it is necessary to set a feedback gain to a value larger than 0 dB. However, as described in detail in the section of Best Mode for Carrying Out the Invention, when the feedback gain is set to a large value in order to further obtain a vibration control amount, the vibration is amplified in a frequency range of 100 Hz or less to generate noise disadvantageously.

SUMMARY OF INVENTION

In one aspect, an object of the present invention is to provide a plate-like member vibration control device including a piezoelectric element actuator, a piezoelectric element sensor, and a control circuit, in which amplification of vibration is prevented in a range where a vibration frequency is equal to or less than a predetermined value, a feedback gain is increased, and suppression of the vibration and reduction in noise generated by the vibration are possible.

In order to achieve the above object, a first embodiment of the invention proposes a plate-like member vibration control device including: a plurality of piezoelectric element actuators disposed on a surface of a plate-like member; at least one piezoelectric element sensor disposed on the surface of the plate-like member at a position sandwiched by the plurality of piezoelectric element actuators, for example, at least two piezoelectric element actuators are positioned in each vicinity of one side and another side of the piezoelectric element sensor such that the piezoelectric element sensor is located between the piezoelectric element actuators in the surface direction of the plate-like member, while it should also be noted that the piezoelectric element actuators and the piezoelectric element sensor may be disposed on an opposite surface of the plate-like member with that layout on the surface direction; and a control circuit that performs feedback control of operation of the plurality of piezoelectric element actuators based on an output voltage of the piezoelectric element sensor so as to suppress vibration of the plate-like member, in which a layout of the piezoelectric element sensor and the piezoelectric element actuators is set such that anti-resonance occurs in the output voltage of the piezoelectric element sensor in a range where a vibration frequency of the plate-like member is equal to or less than a predetermined value.

A second embodiment of the invention proposes a plate-like member vibration control device having the configuration of the first embodiment of the invention, in which the number of the piezoelectric element actuators is two, and the number of the piezoelectric element sensors is one.

A third embodiment of the invention proposes a plate-like member vibration control device having the configuration of the first embodiment of the invention, in which the number of the piezoelectric element sensors is plural, and the plurality of piezoelectric element sensors is electrically connected in series, in parallel, or in combination of series and parallel.

A fourth embodiment of the invention proposes a plate-like member vibration control device having the configuration of any one of the first to third embodiments of the invention, in which the piezoelectric element actuators are fixed to one surface of the plate-like member, and the piezoelectric element sensor is fixed to the other surface of the plate-like member.

A fifth embodiment of the invention proposes a plate-like member vibration control device having the configuration of any one of the first to fourth embodiments of the invention, in which the number of the piezoelectric element actuators is plural, and the plurality of piezoelectric element actuators is fixed to both one surface and the other surface of the plate-like member.

Effect of the Invention

According to the configuration of the first embodiment, a plate-like member vibration control device includes: a plurality of piezoelectric element actuators disposed on a plate-like member; at least one piezoelectric element sensor disposed on a surface of the plate-like member at a position sandwiched by the plurality of piezoelectric element actuators; and a control circuit that performs feedback control of operation of the plurality of piezoelectric element actuators based on an output voltage of the piezoelectric element sensor so as to suppress vibration of the plate-like member. Therefore, the vibration of the plate-like member can be suppressed, and noise generated by the vibration can be reduced.

The layout of the piezoelectric element sensor and the piezoelectric element actuators is set such that anti-resonance occurs in the output voltage of the piezoelectric element sensor in a range where the vibration frequency of the plate-like member is equal to or less than a predetermined value. Therefore, anti-resonance can be caused in the range where the vibration frequency of the plate-like member is equal to or less than a predetermined value to prevent generation of noise, and a feedback gain can be increased. Furthermore, the vibration can be suppressed, and noise generated by the vibration can be reduced.

According to the configuration of the second embodiment, the number of the piezoelectric element actuators is two, and the number of the piezoelectric element sensors is one. Therefore, by setting the number of each of the piezoelectric element actuators and the piezoelectric element sensors to a minimum number, the number of parts and cost can be reduced.

According to the configuration of the third embodiment, the number of the piezoelectric element sensors is plural, and the plurality of piezoelectric element sensors is electrically connected in series, in parallel, or in combination of series and parallel. Therefore, the degree of freedom in setting is increased when the output voltage of the piezoelectric element sensor is adjusted.

According to the configuration of the fourth embodiment, the piezoelectric element actuators are fixed to one surface of the plate-like member, and the piezoelectric element sensor is fixed to the other surface of the plate-like member. Therefore, interference between the piezoelectric element actuators and the piezoelectric element sensor is prevented, and the degree of freedom in layout is increased.

According to the configuration of the fifth embodiment, the number of the piezoelectric element actuators is plural, and the plurality of piezoelectric element actuators is fixed to both one surface and the other surface of the plate-like member.

Therefore, a vibration control force by the piezoelectric element actuators can be increased.

DETAILED DESCRIPTION OF EMBODIMENTS OF THE INVENTION

First Embodiment

Hereinafter, a first embodiment of the present invention will be described based on FIGS. 1 to 7(B).

Figure 1:
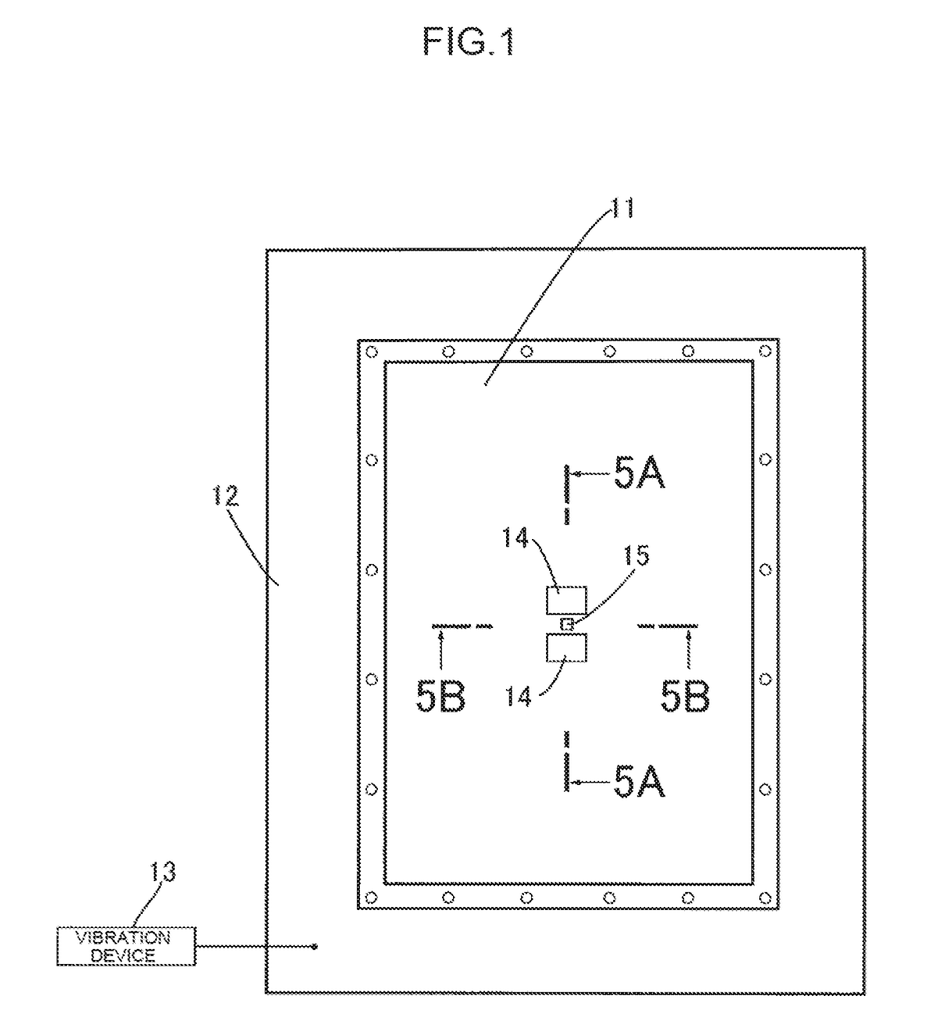
FIG. 1 is a view illustrating a plate-like member including a sensor and an actuator. (First embodiment)
Figure 2:
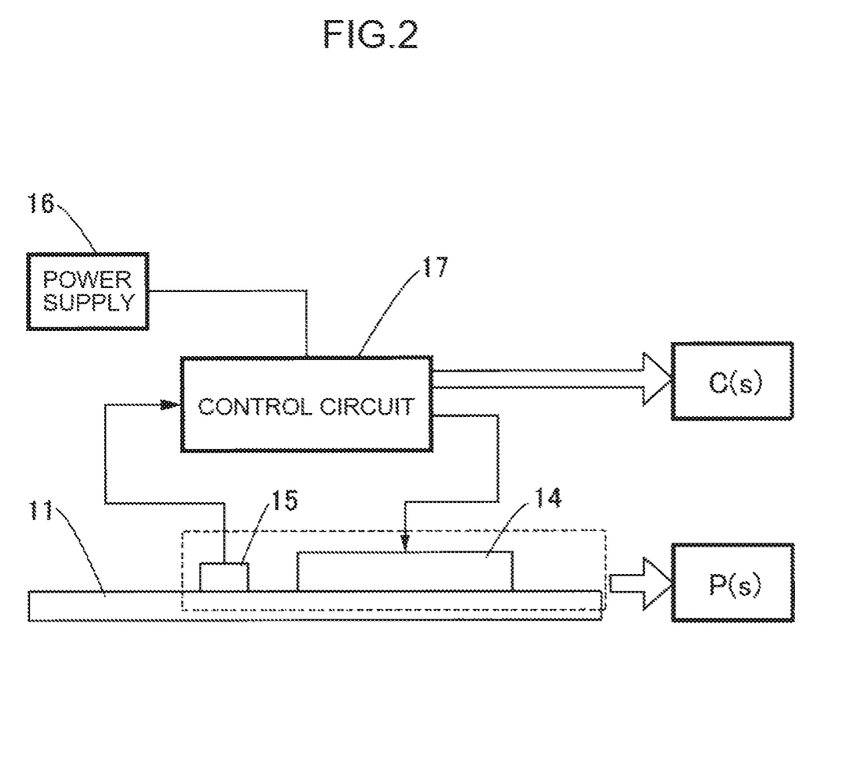
FIG. 2 is a view illustrating an entire configuration of a vibration control device. (First embodiment)

As illustrated in FIGS. 1 and 2, a plate-like member 11 to which a vibration control device of the present invention is applied is formed of a rectangular panel made of a carbon fiber reinforced resin. A metal frame 12 supporting an outer peripheral portion of the plate-like member 11 via an elastic member having sufficiently lower elastic modulus than the metal frame is connected to a vibration device 13 and vibrated at various frequencies. A vibration control device that controls vibration of the plate-like member 11 vibrated by the vibration device 13 includes two rectangular sheet-like piezoelectric element actuators 14, one rectangular sheet-like piezoelectric element sensor 15, a power supply 16, and a control circuit 17 that controls operation of the piezoelectric element actuators 14 based on an output of the piezoelectric element sensor 15.

The one piezoelectric element sensor 15 is fixed to the central portion of one surface (for example, an upper surface) of the plate-like member 11 by adhesion, and the two piezoelectric element actuators 14 are fixed to the upper surface of the plate-like member 11 by adhesion so as to sandwich the one piezoelectric element sensor 15 from both sides.

The piezoelectric element sensor 15 is fixed to the upper surface of the plate-like member 11 that causes film surface vibration in the vertical direction by the vibration device 13. Therefore, when the plate-like member 11 is bent upward convexly, the piezoelectric element sensor 15 is stretched to output a negative voltage. Conversely, when the plate-like member 11 is bent downward convexly, the piezoelectric element sensor 15 is compressed to output a positive voltage.

The piezoelectric element actuators 14 are fixed to the upper surface of the plate-like member 11. Therefore, if a positive voltage is applied to the piezoelectric element actuators 14 and the piezoelectric element actuators 14 are compressed in an in-plane direction when the plate-like member 11 is bent upward convexly, a vibration control force that suppresses the bending of the plate-like member 11 is generated. Conversely, if a negative voltage is applied to the piezoelectric element actuators 14 and the piezoelectric element actuators 14 are stretched in an in-plane direction when the plate-like member 11 is bent downward convexly, a vibration control force that suppresses the bending of the plate-like member 11 is generated.

Therefore, the control circuit 17 performs feedback control of tension and compression of the piezoelectric element actuators 14 such that strain of the plate-like member 11 detected by the piezoelectric element sensor 15 that detects strain of a plate surface due to bending vibration of the plate converges to zero. As a result, the vibration of the plate-like member 11 can be controlled.

In a primary resonance mode or a tertiary resonance mode in which the plate-like member 11 vibrates particularly largely, the central portion of the plate-like member 11 acts as an antinode of vibration and the amplitude is the largest. However, by disposing the piezoelectric element sensor 15 at this position, the strain of the plate-like member 11 can be reliably detected, and the vibration amplified by resonance can be effectively controlled.

Figure 3:
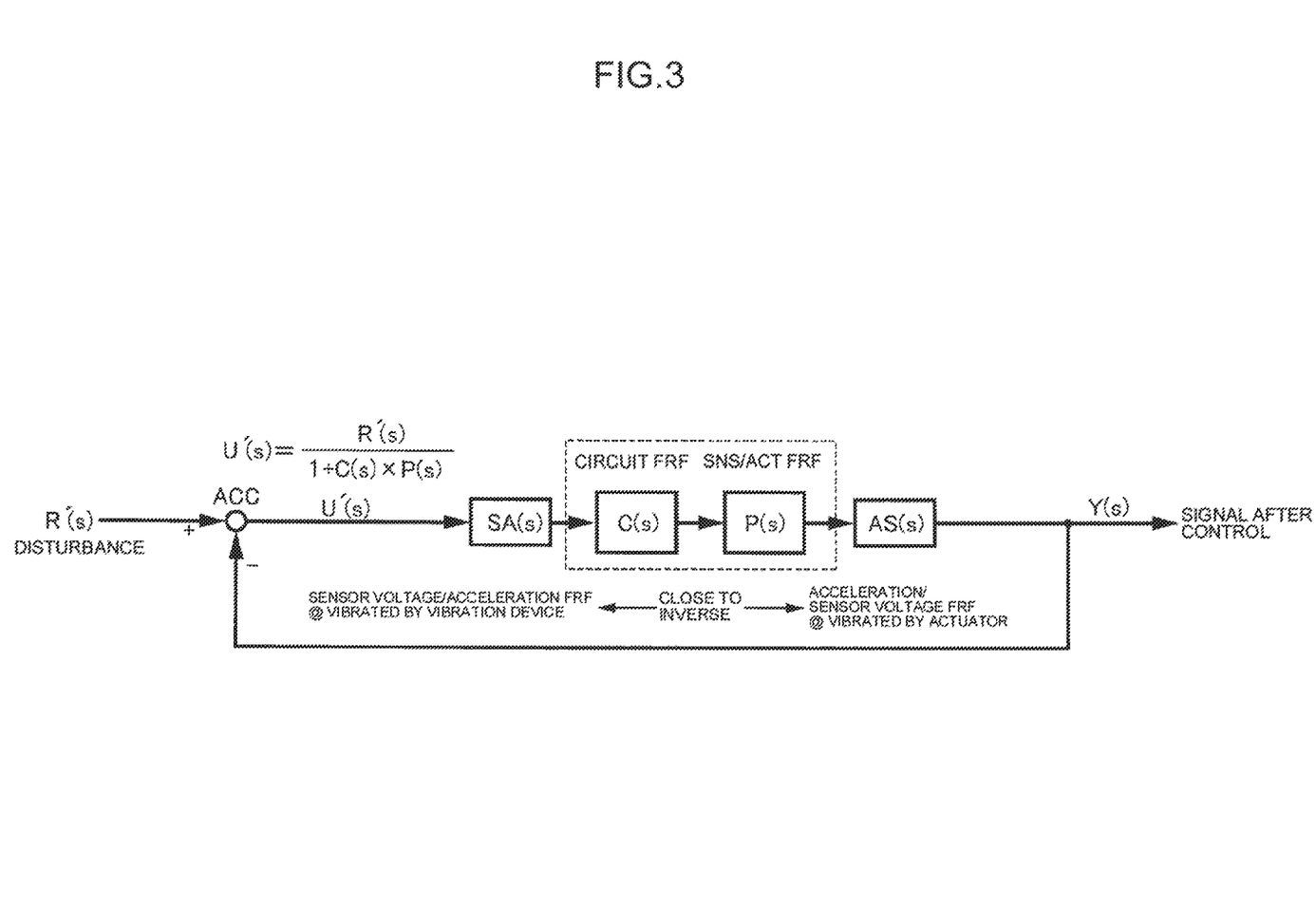
FIG. 3 is a control block diagram of the vibration control device. (First embodiment)

In the block diagram of the control system illustrated in FIG. 3, P(s) [V/V] represents a transfer function of a voltage output from the piezoelectric element sensor 15 with respect to a voltage input to each of the piezoelectric element actuators 14, C(s) [V/V] represents a transfer function of a voltage input to each of the piezoelectric element actuators 14 with respect to a voltage output from the piezoelectric element sensor 15, SA(s) [V/m/s$^2$] represents a sensor voltage/acceleration transfer function when vibration is applied by the vibration device 13, and AS(s) [V/m/s$^2$] represents an acceleration/sensor voltage transfer function when vibration is applied by each of the piezoelectric element actuators 14.

P(s) expressed as a piezoelectric element sensor/piezoelectric element actuator (SNS/ACT) transfer function is determined by a layout indicating the sizes, the shapes, and the positional relationship of the piezoelectric element actuators 14 and the piezoelectric element sensor 15. C(s) as a transfer function of the control circuit 17 defines the amount of amplification of the control circuit 17. Since SA(s) and AS(s) are approximately in an inverse relationship, the loop transfer function that determines vibration control performance of the control system is represented by [C(s)×P(s)].

Figure 4A:
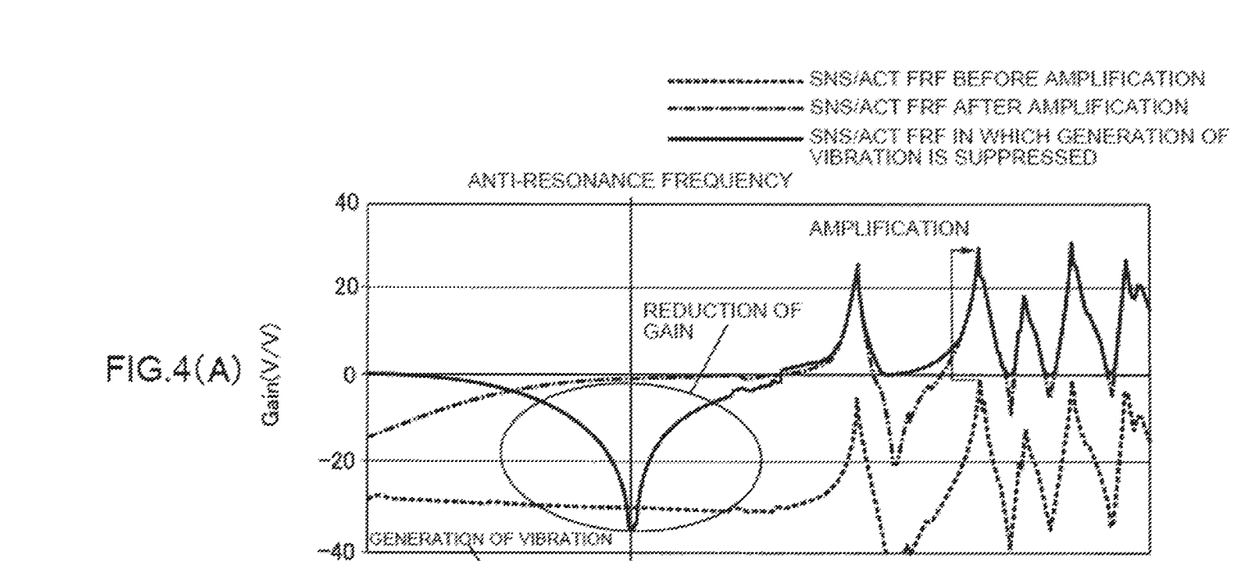
FIGS. 4(A) and 4(B) are Bode diagrams of a loop transfer function of a control system of the vibration control device. (First embodiment)
Figure 4B:
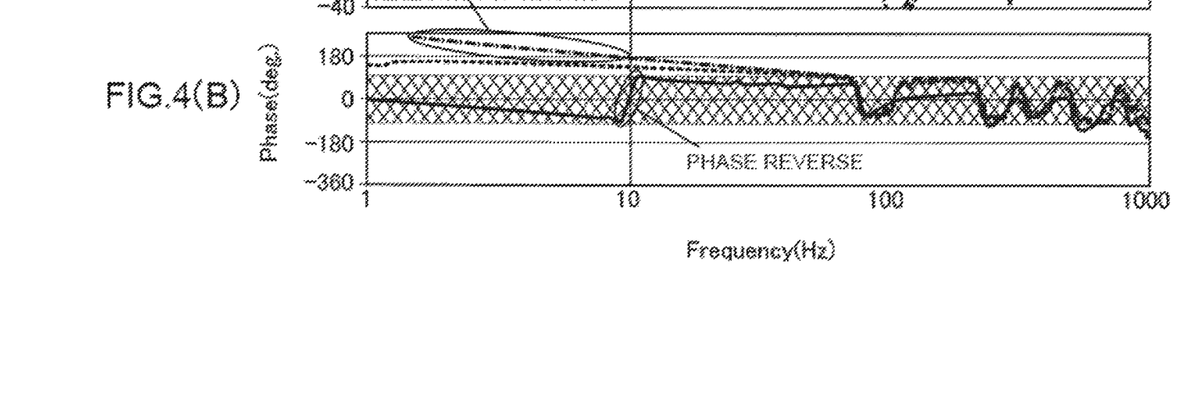

FIGS. 4(A) and 4(B) are Bode diagrams of the loop transfer function [C(s)×P(s)]. FIG. 4(A) is a gain diagram with respect to the vibration frequency of the plate-like member 11. FIG. 4(B) is a phase diagram with respect to the vibration frequency of the plate-like member 11. The broken line indicates the characteristics P(s). The chain line indicates the characteristics in the control circuit 17 after amplification. The solid line indicates the characteristics after generation of noise of 100 Hz or less is prevented and amplification is performed by the control circuit 17.

Due to an effect of a high-pass filter described later, in a noise generation preventing frequency range of 100 Hz or less, a gain is reduced, and a phase develops as indicated by the one dot chain line.

In order for the piezoelectric element actuators 14 to exhibit an effective vibration control function, the gain needs to be larger than 0 dB, and the phase shift needs to be in a range of −90° to 90°. However, as the characteristics before amplification indicated by the broken line, the gain is less than 0 dB. Therefore, the gain needs to be increased so as to be larger than 0 dB by amplification to be in the state of the chain line. However, in a case where a feedback gain is increased in order to reduce the vibration and the gain becomes larger than 0 dB, the phase shift largely deviates from the range of −90° to 90° to exceed 180° in the vibration frequency range of 100 Hz or less, and the vibration is amplified in this frequency range to generate noise.

A reason why the phase shift exceeds 180° is as follows. Inclusion of a direct current component in an output of the piezoelectric element sensor 15 cannot be avoided due to an influence of temperature change or static deformation. When a vibration component of the output of the piezoelectric element sensor 15 is amplified in a state where the vibration component contains the direct current component, an amplification limit of an amplifier is reached. Therefore, it is necessary to remove the direct current component using a high-pass filter. However, by using the high-pass filter, not only the gain is reduced but also the phase advances. Therefore, by using two or more high-pass filters, the phase shift exceeds 180°.

The present invention solves the above-described generation of noise of 100 Hz or less by the layout of the piezoelectric element actuators 14 and the piezoelectric element sensor 15.

Figure 5A:
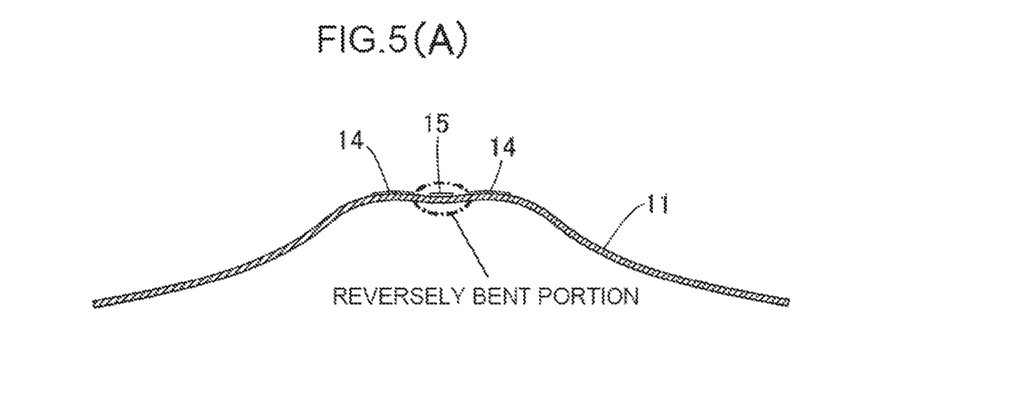
FIGS. 5(A) and 5(B) are cross-sectional views taken along line A-A and line B-B of FIG. 1, respectively, illustrating a deformed state of a plate-like member during actuator vibration in a low frequency range of 100 Hz or less. (First embodiment)
Figure 5B:
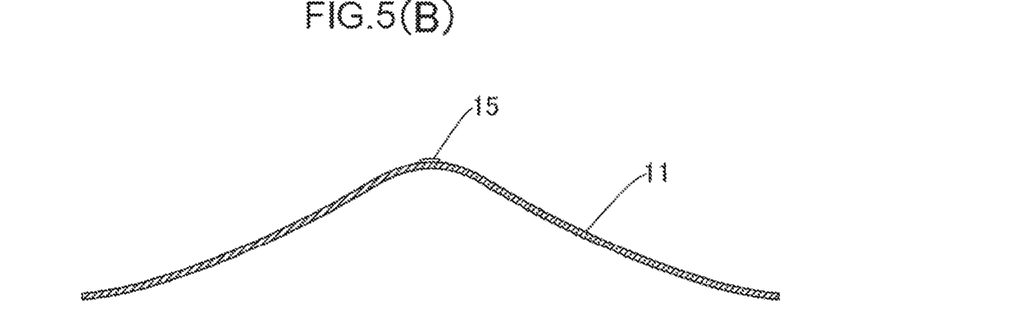

FIGS. 5(A) and 5(B) illustrate a state in which the plate-like member 11 is deformed upward convexly by the piezoelectric element actuators 14 attached to a surface of the plate-like member 11 in a frequency range of 100 Hz or less.

At this time, as illustrated in FIG. 5(A), when a negative voltage is applied to the piezoelectric element actuators 14 to stretch the piezoelectric element actuators 14 in an in-plane direction, in a cross section (cross-section taken along line A-A in FIG. 1) passing through the piezoelectric element actuators 14 of the plate-like member 11, the two piezoelectric element actuators 14 are separately disposed so as to sandwich the center of the plate-like member 11. Therefore, the central portion of the plate-like member 11 sandwiched by the two piezoelectric element actuators 14 is locally deformed downward convexly. Meanwhile, as illustrated in FIG. 5(B), in a cross section (cross-section taken along line B-B in FIG. 1) not passing through the piezoelectric element actuators 14 of the plate-like member 11, the above-described reverse deformation of the plate-like member 11 does not occur, and the plate-like member 11 is deformed simply upward convexly.

Therefore, the piezoelectric element sensor 15 fixed to the center of the plate-like member 11 is not simply stretched as a whole, but is compressed at a portion where the reverse deformation occurs. In the piezoelectric element sensor 15, a portion that is stretched in a plane to generate a positive voltage and a portion that is compressed in the plane to generate a negative voltage are mixed. The portion that generates a positive voltage becomes dominant as it approaches a peak frequency of a primary mode, and therefore can reverse the polarity of the voltage from the state where the negative voltage is dominant in a low frequency range and can cause anti-resonance.

Figure 6:
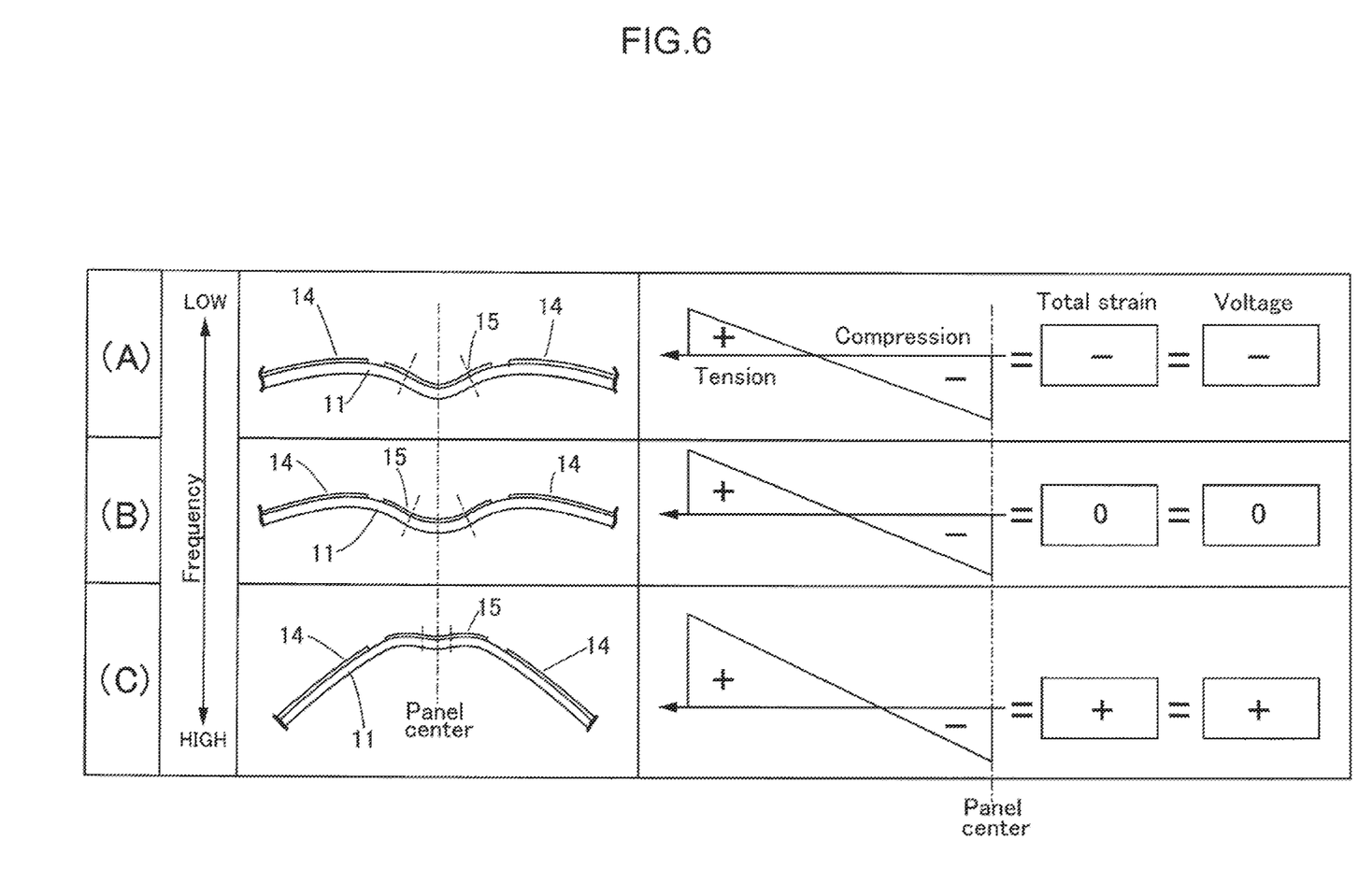
FIG. 6 is explanatory diagrams of principle (sections (A) to (C)) that an output voltage of a piezoelectric element sensor is reversed. (First embodiment)

That is, the section (A) of FIG. 6 illustrates a cross section of the plate-like member 11 passing through the two piezoelectric element actuators 14 and the piezoelectric element sensor 15. The piezoelectric element sensor 15 fixed to the central portion of the plate-like member 11 at a frequency equal to or lower than a primary resonance frequency outputs a positive voltage in a state where both sides of the piezoelectric element sensor 15 are forward bent (deformation direction of the entire plate-like member 11, deformed upward convexly in the case of this drawing), and outputs a negative voltage in a state where the central portion of the piezoelectric element sensor 15 is reversely bent (direction opposite to deformation direction of the entire plate-like member 11, deformed downward convexly in the case of this drawing). At this time, since the reverse bending is stronger than the forward bending, the plate-like member 11 outputs a negative voltage as a whole.

When the vibration frequency increases to a predetermined frequency (about 10 Hz in the embodiment), as illustrated in the section (B) of FIG. 6, forward bending competes with reverse bending in the piezoelectric element sensor 15, and the output voltage of the plate-like member 11 becomes zero. When the vibration frequency further increases and approaches the primary resonance frequency, as illustrated in the section (C) of FIG. 6, the reversely bent portion at the center of the piezoelectric element sensor 15 almost disappears, and the forward bending becomes stronger than the reverse bending. Therefore, the plate-like member 11 outputs a positive voltage as a whole.

In this manner, when the output voltage of the piezoelectric element sensor 15 is balanced at a predetermined frequency in a frequency range of 100 Hz or less, anti-resonance occurs, and the gain takes a minimum value as illustrated by the solid line in the gain diagram of FIG. 4(A). In addition, as illustrated by the solid line in the phase diagram of FIG. 4(B), the sign of the phase shift is reversed from positive to negative and falls in a range of −90° to 90°. As a result, amplification of vibration is suppressed. Therefore, amplification of vibration at 100 Hz or less can be prevented. Therefore, the output voltage of the piezoelectric element sensor 15 is sufficiently amplified to effectively suppress vibration of the plate-like member 11 in a control target frequency range of several tens Hz to 1000 Hz, and noise characteristics generated by the vibration can be improved.

Only by disposing the piezoelectric element sensor 15 at the central portion of the plate-like member 11 and disposing the two piezoelectric element actuators 14 so as to sandwich the piezoelectric element sensor 15, the above-described reverse of the output voltage of the piezoelectric element sensor 15 does not necessarily occur. In order to cause reverse of the output voltage of the piezoelectric element sensor 15, it is necessary to adjust the layout indicating the sizes, the shapes, and the positional relationship of the piezoelectric element actuators 14 and the piezoelectric element sensor 15.

Figure 7A:
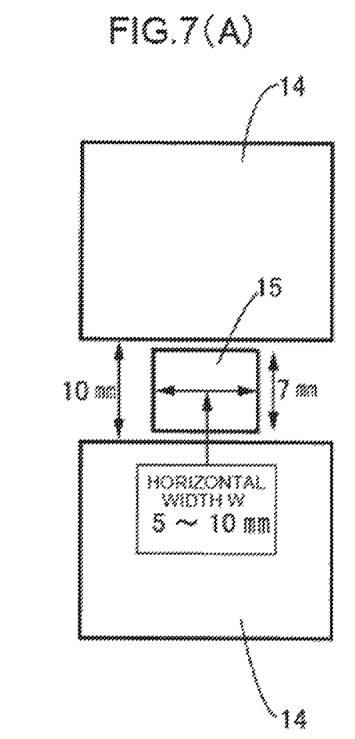
FIGS. 7(A) and 7(B) are explanatory diagrams of a method for setting a layout of a piezoelectric element actuator and a piezoelectric element sensor. (First embodiment)
Figure 7B:
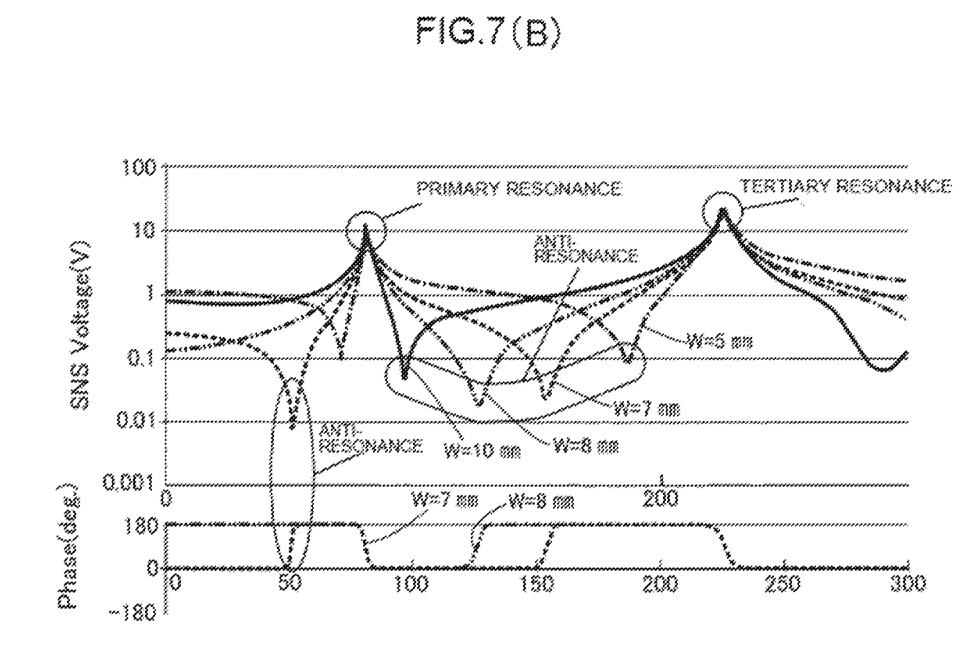

FIG. 7(A) illustrates a case where the piezoelectric element sensor 15 having a vertical width of 7 mm and a horizontal width W of 5 mm to 10 mm is disposed between the two piezoelectric element actuators 14 juxtaposed in a longitudinal direction with a gap of 10 mm. FIG. 7(B) illustrates output characteristics of the piezoelectric element sensor 15 when the vibration frequency is changed. When the horizontal width W of the piezoelectric element sensor 15 is set to 7 mm, the output voltage gain of the piezoelectric element sensor 15 is significantly reduced in a frequency range of 100 Hz or less, and the phase of the output voltage of the piezoelectric element sensor 15 is thereby reversed.

Therefore, by adjusting the layout of the piezoelectric element actuators 14 and the piezoelectric element sensor 15, a ratio between a forward bent portion and a reversely bent portion in the piezoelectric element sensor 15 is changed in a frequency range of 100 Hz or less, and the output voltage of the piezoelectric element sensor 15 can be reversed to cause anti-resonance.

As described above, according to the present embodiment, by using the two piezoelectric element actuators 14 and the one piezoelectric element sensor 15, the number of the piezoelectric element actuators 14 and the piezoelectric element sensors 15 can be minimized, the structure can be simplified, the weight can be reduced, and cost can be reduced.

By causing anti-resonance in the output voltage of the piezoelectric element sensor 15 in a frequency range where noise of the plate-like member 11 is generated, a vibration control effect in a frequency range higher than the frequency range is effectively exhibited to suppress vibration, and noise generated by the vibration can be reduced.

Second Embodiment

Figure 8:
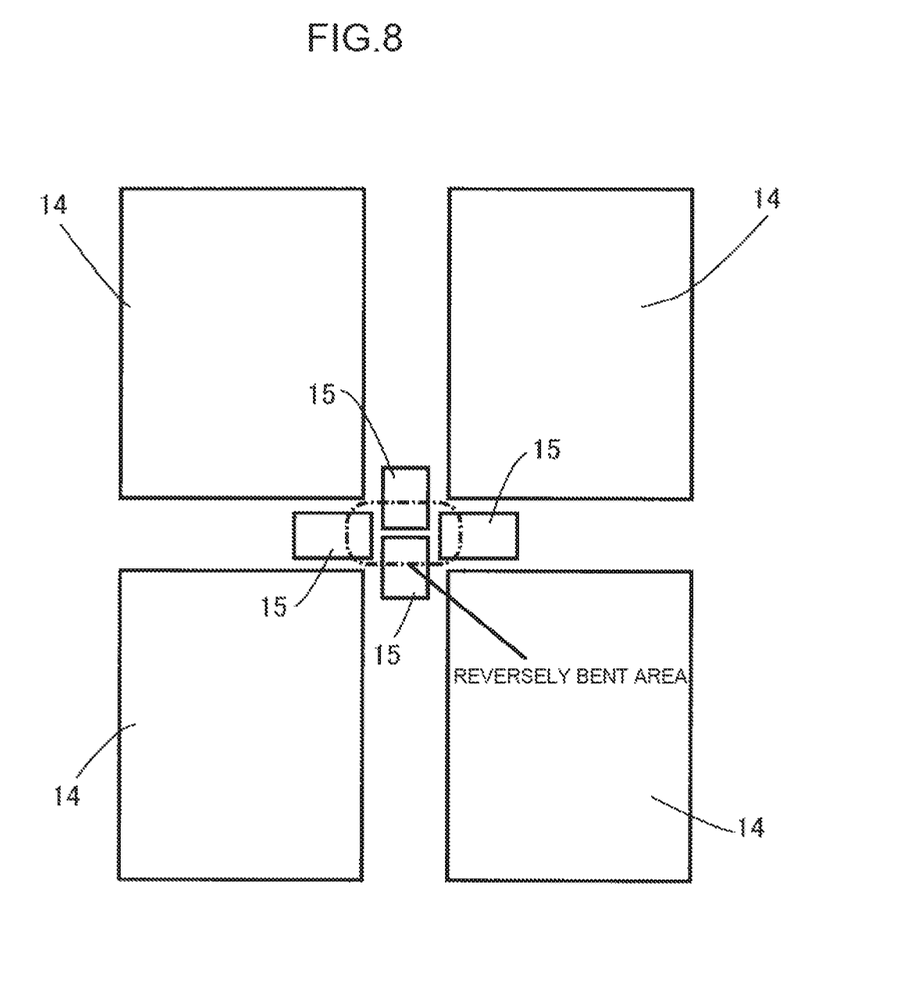
FIG. 8 is a view illustrating a plate-like member including a vibration control device. (Second Embodiment)

Next, a second embodiment of the present invention will be described based on FIG. 8.

The vibration control device of the first embodiment includes the two piezoelectric element actuators 14 and the one piezoelectric element sensor 15. However, a vibration control device of the second embodiment includes four piezoelectric element actuators 14 and four piezoelectric element sensors 15. The four piezoelectric element sensors 15 each formed in a band shape are disposed in a cross shape at positions sandwiched by the four piezoelectric element actuators 14 each formed in a rectangular shape. The piezoelectric element sensors 15 are electrically connected in series, in parallel, or in combination of series and parallel (for example, two of the piezoelectric element sensors 15 are connected in parallel, and then the remaining two piezoelectric element sensors 15 are connected in series). The length of each of the four piezoelectric element sensors 15 is set such that anti-resonance occurs in the output voltage of the entire four piezoelectric element sensors 15 in a frequency range of 100 Hz or less.

According to the second embodiment, the plurality of piezoelectric element sensors 15 is electrically connected in series, in parallel, or in combination of series and parallel. As a result, compared with the case where the number of the piezoelectric element sensors 15 is one, the degree of freedom in setting the output voltage of the plurality of piezoelectric element sensors 15 as a whole can be increased. For example, when the frequency approaches a primary resonance frequency (about 80 Hz in the embodiment) because anti-resonance generates a too high frequency, it may be impossible to effectively control a large vibration of a primary resonance due to the anti-resonance. However, in such a case, by changing the connection form of the plurality of piezoelectric element sensors 15, the anti-resonance frequency can be easily lowered and adjusted to a desired value.

Hitherto, the embodiments of the present invention have been described. However, various design changes of the present invention can be performed in a range not deviating from a gist thereof.

For example, the piezoelectric element actuator 14 and the piezoelectric element sensor 15 are fixed to the same side surface of the plate-like member 11 in the embodiments. However, the piezoelectric element actuator 14 may be fixed to one surface of the plate-like member 11, and the piezoelectric element sensor 15 may be fixed to the other surface of the plate-like member 11. In this manner, interference between the piezoelectric element actuator 14 and the piezoelectric element sensor 15 is prevented, and the degree of freedom in layout is increased. However, the polarity of the output voltage of the piezoelectric element sensor 15 changes depending on a side surface to which the piezoelectric element sensor 15 is fixed. Therefore, the polarity of the output voltage of the piezoelectric element sensor 15 needs to be processed by the control circuit 17 according to a surface to which the piezoelectric element sensor 15 is fixed.

Note that regardless of a surface of the plate-like member 11 to which the piezoelectric element actuator 14 and the piezoelectric element sensor 15 are fixed, the piezoelectric element actuator 14 and the piezoelectric element sensor 15 are desirably disposed at different positions (positions not overlapping with each other, viewed from a direction orthogonal to a surface of the plate-like member 11). This is because when the piezoelectric element actuator 14 and the piezoelectric element sensor 15 are disposed at the same position, the piezoelectric element sensor 15 preferentially detects strain by the piezoelectric element actuator 14, and it is difficult to detect strain due to disturbance to reduce vibration control performance.

The number of the piezoelectric element actuators 14 and the number of the piezoelectric element sensors 15 are not limited to those in the embodiments, and the number of the piezoelectric element actuators 14 only needs to be plural, and the number of the piezoelectric element sensors 15 only needs to be at least one.

When the plurality of piezoelectric element actuators 14 is fixed to both one (a first) surface and the other (a second) surface of the plate-like member 11, a vibration control force by the piezoelectric element actuators 14 can be increased, and vibration control performance can be further enhanced.

A material of the plate-like member 11 is not limited to the carbon fiber reinforced resin plate of the embodiments, and may be another type of fiber reinforced resin plate or any metal plate such as a steel plate or an aluminum plate.

The piezoelectric element actuator 14 and the piezoelectric element sensor 15 are fixed to the plate-like member 11 by adhesion in the embodiments, but can be fixed by a method other than adhesion, and can be detachably attached.

The invention claimed is:

1. A plate-like member vibration control device comprising:
    a plate-like member;
    a plurality of piezoelectric element actuators disposed on a surface of the plate-like member;
    at least one piezoelectric element sensor disposed on the surface of the plate-like member at a position between the plurality of piezoelectric element actuators; and
    a control circuit configured to perform feedback control of operation of the plurality of piezoelectric element actuators based on an output voltage of the piezoelectric element sensor so as to suppress vibration of the plate-like member, wherein
    the piezoelectric element sensor and the piezoelectric element actuators are positioned on the surface of the plate-like member with such layout that a part of the piezoelectric element sensor is deformed in a first direction and another part of the piezoelectric element sensor is deformed in a second direction opposite to the first direction in such a manner that anti-resonance occurs in the output voltage of the piezoelectric element sensor in a range where a vibration frequency of the plate-like member is 100 Hz or less.

2. The plate-like member vibration control device according to claim 1, wherein a number of the piezoelectric element actuators is two, and a number of the at least one piezoelectric element sensor is one.

3. The plate-like member vibration control device according to claim 1, wherein a number of the at least one piezoelectric element sensor is plural, and the plural piezoelectric element sensors are electrically connected to one another in series, in parallel, or in combination of series and parallel.

4. The plate-like member vibration control device according to claim 1, wherein
    the plate-like member has a first surface and a second, opposite surface, and
    the piezoelectric element actuators are fixed to the first surface of the plate-like member, and the at least one piezoelectric element sensor is fixed to the second surface of the plate-like member.

5. The plate-like member vibration control device according to claim 1, wherein
    the plate-like member has a first surface and a second, opposite surface, and
    the plurality of piezoelectric element actuators are fixed to each of the first and second surfaces of the plate-like member.

* * * * *